UNITED STATES PATENT OFFICE.

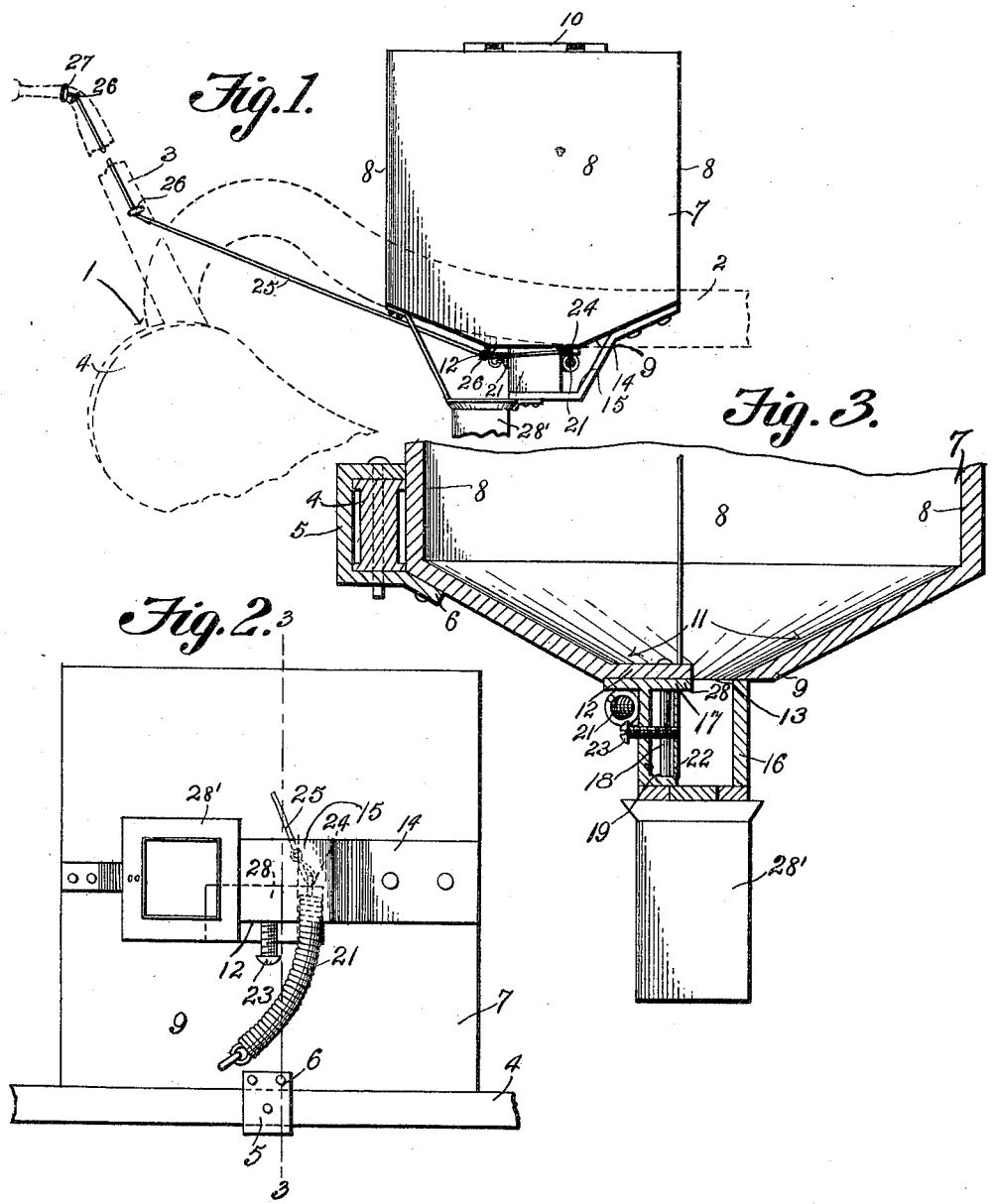

JOHN H. ROGERS, OF JACKSONVILLE, TEXAS.

SEED-PLANTER.

1,006,286.     Specification of Letters Patent.     Patented Oct. 17, 1911.

Application filed May 5, 1911. Serial No. 625,235.

*To all whom it may concern:*

Be it known that I, JOHN H. ROGERS, a citizen of the United States, residing at Jacksonville, in the county of Cherokee and State of Texas, have invented certain new and useful Improvements in Seed-Planters; and I do hereby declare the following to be a full, clear, and exact description of the invention, such as will enable others skilled in the art to which it appertains to make and use the same.

This invention relates to new and useful improvements in seed planters.

An object of this invention is the provision of a seed planter which may be secured to a plow of ordinary construction and operated for the purpose of dropping seed at intervals in the path of the plow shares.

Another object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawing, in which—

Figure 1 is a side elevation of my invention; Fig. 2 is a bottom plan view thereof; and Fig. 3 is a vertical fragmentary transverse sectional view taken on the line 3—3 of Fig. 2.

Referring to the drawing by characters of reference, the numeral 1 designates a plow of ordinary type, consisting of the usual plow stock 2, to one end of which is attached the customary plow handles 3, while to the lower side thereof is secured in the usual manner the plow shares 4.

A bracket 5 is bolted, or otherwise removably secured to a suitable point upon the plow stock 2, and has formed upon its outer terminal a plate 6, which is bolted, riveted, or otherwise secured, to a hopper 7. This hopper 7 is substantially rectangular in shape, and consists of opposite side and end walls 8, the lower ends of which are connected by a suitable bottom 9, while the upper end is closed by a removable top 10.

The bottom is downwardly tapered, as at 11, terminating in a reduced plate 12, being apertured, as at 13, to provide an outlet for the seeds or the like which are contained within the hopper 7.

A depending bracket 14 is secured to the bottom of the hopper 7, and extends laterally, as indicated by the numeral 15, for the purpose of supporting and forming a closure for the bottom of the dropper 16. This dropper 16 consists of a plate 17, which is pivoted by means of a pin 18 to the bottom 9 of the hopper 7, the lower extremity of which is provided with an inward extension, 19.

A tension spring 21 is secured to an eye located upon the bottom 9 of the hopper and is secured at its upper terminal adjacent to and at one side of the pin 18, and serves to normally hold the same so that the lower open end thereof will be closed by the lateral offset 15.

A follower 22 is located slidably within hopper 16, and is adjustable through the medium of a set screw 23, which serves to limit the amount of seed deposited within said dropper 16. One side of the dropper 16 has formed thereon an eye 24, to which is attached a flexible operating member 25, which passes through a series of pulleys 26, and is secured at its opposite end to a ring 27 secured to the handle within the convenient reach of the operator. Obviously, when the ring 27 is engaged by the index finger of the operator, a slight pull of the same will serve to swing the dropper from over the offset 15 of the bracket 14, thus permitting the seed contained therein to be deposited at any desired interval in advance of the path of the plow share 4. The plate 17, when the dropper is thus turned, will close the aperture 13 in the plate 12, which will prevent any other seed from escaping from the hopper 7. The plate 17 is provided with an upward extension 28, which serves as an agitator for the purpose of preventing the seeds from becoming packed against the plate 12, which might serve to prevent their ready flow into the dropper 16.

From the foregoing disclosure, taken in connection with the accompanying drawings, it will be manifest that a seed planter is provided for which will fulfil all of the necessary requirements of such a device.

In order to further insure the proper depositing of the seeds, a seed trough 28' is secured to the bracket 14, and the hopper 7 by means of brackets through which the seed or the like contained within the hopper may be directed to any desired point, either in the path of the plow share or otherwise.

Having thus fully described this invention, what I claim as new and desire to secure by Letters Patent is:

A seed planter combining a plow, a hopper secured thereto, a bracket secured to the bottom of the hopper, a lateral extension formed upon said bracket, a dropper pivoted to said hopper, a follower adjustable within said member for the purpose of limiting the quantity of seed to be contained therein, a spring secured to said hopper and dropper for the purpose of normally closing the bottom thereof by means of the bracket, a flexible connector secured to said dropper, whereby the same may be moved from over the bracket, a plate secured to the upper end of the dropper and adapted to close the opening formed in the bottom of the hopper, through which the seeds pass when the dropper is moved from over the bracket, an agitator carried by the said plate, and a trough secured to the bracket, through which the seed may be guided to any locality, substantially as and for the purposes set forth.

In testimony whereof I affix my signature in presence of two witnesses.

JNO. H. ROGERS.

Witnesses:
  W. H. BANKS,
  J. H. QUICK.

---

Copies of this patent may be obtained for five cents each, by addressing the "Commissioner of Patents, Washington, D. C."